(12) United States Patent
Castaing et al.

(10) Patent No.: US 7,671,115 B2
(45) Date of Patent: Mar. 2, 2010

(54) METHOD FOR ENHANCING WATER-REPELLENCY TREATMENT OF MINERAL HYDRAULIC BINDER COMPOSITIONS AND COMPOSITIONS OBTAINABLE BY SAID METHOD AND THEIR USES

(75) Inventors: Jean-Christophe Castaing, Paris (FR); Gary Baker, Manchester (GB); Philippe Jost, Lyons (FR)

(73) Assignee: Hexion Specialty Chemicals, Inc., Columbus, OH (US)

( * ) Notice: Subject to any disclaimer, the term of this patent is extended or adjusted under 35 U.S.C. 154(b) by 863 days.

(21) Appl. No.: 10/538,681

(22) PCT Filed: Dec. 12, 2003

(86) PCT No.: PCT/FR03/03699

§ 371 (c)(1),
(2), (4) Date: Jun. 10, 2005

(87) PCT Pub. No.: WO2004/054941
PCT Pub. Date: Jul. 1, 2004

(65) Prior Publication Data
US 2006/0116446 A1    Jun. 1, 2006

(30) Foreign Application Priority Data
Dec. 13, 2002    (FR)    .................. 02 15849

(51) Int. Cl.
*C04B 24/16*    (2006.01)
(52) U.S. Cl. .......................................... 524/3; 524/556
(58) Field of Classification Search ............... 106/93, 106/95, 119, 315; 524/2, 5, 160, 171, 342, 524/366, 3, 556
See application file for complete search history.

(56) References Cited

U.S. PATENT DOCUMENTS 4,169,736 A * 10/1979 Nielsen .................. 106/664

\* cited by examiner

*Primary Examiner*—Robert D. Harlan

(57) ABSTRACT

The invention concerns a method for enhancing water-repellency repellency treatment of mineral hydraulic binder compositions and compositions obtainable by said method and their uses in the building sector, said method comprising the step of adding a sufficient amount of at least one monovalent cation salt of a carboxylic acid to said composition.

21 Claims, No Drawings

METHOD FOR ENHANCING WATER-REPELLENCY TREATMENT OF MINERAL HYDRAULIC BINDER COMPOSITIONS AND COMPOSITIONS OBTAINABLE BY SAID METHOD AND THEIR USES

This application is an application under 35 U.S.C. Section 371 of International Application Number PCT/FR2003/003699 filed on Dec. 12, 2003.

The present invention relates to a method for enhancing the water repellency of inorganic hydraulic binder compositions, to the compositions capable of being obtained by this method and to the uses of these compositions in the field of building.

Ever since mankind began constructing artificial dwellings, one problem has been the penetration of moisture into these dwellings. Exposure to events due to the weather, such as rain and snow, can be reduced to a minimum by suitable building, for example roofs with a satisfactory overhang. However, this does not make it possible to control the absorption of water by the building materials due to their capillary action. This can result in leaching of the salts, causing irreversible damage to the cement and thus to the entire composite mortar. To prevent this effect requires that the building structures either be subsequently covered with tar emulsions, asphalt emulsions, wax emulsions or paraffin emulsions, or be impregnated.

The addition of fatty acid carboxylates having a divalent counterion was provided for in the document "Mechanical and Physico-Chemical Properties of Hardened Portland Cement Pastes: Containing Hydrophobic Admixtures", Part 1: ZKG International, 52 (1999), No. 12, pages 697-700.

The addition of a fatty acid carboxylic ester as water repellent has also been disclosed in the document EP 1 193 287.

However, just like the divalent carboxylates of fatty acids, the fatty acid carboxylic esters disclosed in this document are insoluble in water, which makes it more difficult to use them in obtaining a good dispersion of the water repellent in aqueous building material compositions.

This is because these compounds can only be introduced into the aqueous solutions in the form of a dispersion or emulsion, which requires the addition of an emulsifier or of a protective colloid, which interfere with the desired water-repelling property.

The need existed to find a means of introducing a water repellent which does not exhibit the disadvantages described above, that is to say which is easy to use, in particular in obtaining a good dispersion of the water repellent in the building composition, while retaining good effectiveness.

A subject matter of the present invention is thus a method for enhancing the water repellency of an inorganic hydraulic binder composition, characterized in that a sufficient amount of at least one monovalent cation salt of a carboxylic acid is added to said composition.

Hydraulic binders are generally based on cement. They can be in the form of grouts, mortars or concretes. They are used, for example, in the following applications: tiling bonding cements, pointing cements, single surface dressings, external thermal insulation systems, smoothing and finishing coatings, adhesives and coatings for insulating complexes, repair mortars, leaktight coatings and grouts for the cementation of oil wells.

Hydraulic inorganic binders can be chosen from cements which can be of Portland, high-alumina or blast-furnace type. Other compounds often added as additives to cement also exhibit hydraulic properties, such as fly ash or calcined shales. Mention may also be made of pozzolans, which react with lime and form calcium silicates.

This monovalent cation salt of a carboxylic acid can be represented by the following formula:

$$C_nH_{(2n-1)}OO^-X^+ \qquad (I)$$

The term "monovalent cation" ($X^+$) is understood to mean in particular the ions of alkali metals, such as sodium, potassium or lithium, and the ions comprising an ammonium group, such as ammonium and all the quaternary amines.

An alkali metal ion chosen from sodium or potassium is preferred.

The hydrocarbon chain of the carboxylic acid salt $C_nH_{(2n-1)}$ can be saturated or unsaturated and branched or linear. It can also comprise halogens, such as fluorine or chlorine, and hydroxyl groups, ether groups, thioether groups, ester groups, amide groups, carboxyl groups, sulfonic acid groups, carboxylic anhydride groups and/or carbonyl groups.

The length of the hydrocarbon chain of the carboxylic acid varies between 4 and 18 carbon atoms. Preferably, the length of the hydrocarbon chain is between 8 and 16 carbon atoms. More preferably still, the length of the hydrocarbon chain is 12 carbon atoms (n=12).

Sodium laurate and potassium laurate are particularly preferred.

The monovalent cation salt of a carboxylic acid can be incorporated in the form of a solid powder or dissolved in aqueous solution in a sufficient amount in the building composition.

The monovalent cation salt of a carboxylic acid can also be premixed in a sufficient amount with a redispersible latex composition.

This second embodiment is preferred. This is because the monovalent cation salt of a carboxylic acid, when it is used alone, can have an irritant nature. When it is used as a premix with the latex, it no longer has this irritant nature.

In the case where a premix of the carboxylic acid cation salt with the latex is prepared, it is important to note that the hydrocarbon chain has to have an appropriate length in order to avoid excessively large increases in viscosity.

Thus, it is preferable to use carboxylic acid cation salts in which the length of the hydrocarbon chain is less than 18 carbon atoms. More preferably still, the length of the hydrocarbon chain is 12 carbon atoms.

This premix of the monovalent cation salt of a carboxylic acid and of the latex can be prepared in the form of a mixture of water repellent as solid powder in a sufficient amount with a redispersible latex powder composition.

It is also possible to introduce the monovalent cation salt of a carboxylic acid in a sufficient amount into the latex during the polymerization or in postpolymerization and to subsequently dry the latex.

It is also possible to add the monovalent cation salt of a carboxylic acid in the powder form in the tower in which the latex is atomized, that is to say during the drying of the latex.

Preference is given, among all these possible forms of premixes, to the case where a solid powder of the monovalent cation salt of a carboxylic acid is mixed in a sufficient amount with a redispersible latex powder composition.

The term "sufficient amount" is understood to mean, within the meaning of the invention, an amount sufficient to contribute good water repellency to the building composition.

When the monovalent cation salt of a carboxylic acid is added directly to the building composition, the sufficient amount is between 0.001% and 3% by dry weight of the monovalent cation salt of a carboxylic acid, with respect to the total weight of the building composition.

Preferably, this amount is between 0.01% and 0.5% by dry weight of the monovalent cation salt of a carboxylic acid, with respect to the total weight of the building composition.

More preferably still, this amount is between 0.03% and 0.15% by dry weight of the monovalent cation salt of a carboxylic acid, with respect to the total weight of the building composition.

This sufficient amount is low, which exhibits the advantage of avoiding phenomena of delay in setting of the additivated inorganic hydraulic binders.

When the monovalent cation salt of a carboxylic acid is premixed in the form of a solid powder with a redispersible latex powder composition, the sufficient amount is between 0.1% and 20% by weight of monovalent cation salt of a carboxylic acid with respect to the weight of the dry latex.

Preferably, this amount is between 1% and 10% by weight of monovalent cation salt of a carboxylic acid, with respect to the weight of the dry latex.

More preferably still, this amount is between 3% and 7% by weight of monovalent cation salt of a carboxylic acid, with respect to the weight of the dry latex.

The redispersible latex powder used can be of highly varied nature.

Preference is particularly given to a latex composition in the form of a redispersible powder comprising:
  at least one water-insoluble polymer,
  from 0 to 35% by weight, with respect to the total weight of the polymer, of at least one protective colloid,
  from 0 to 30% by weight, with respect to the total weight of the polymer, of anticaking agents, and
  from 0.1 to 20% by weight, with respect to the total weight of the polymer, of the monovalent cation salt of a carboxylic acid.

Suitable water-insoluble polymers are homo- or copolymers which are in the form of an aqueous dispersion or which can be converted to an aqueous dispersion and which can subsequently be put into the powder form by drying by atomization.

The mean particle size of the powder is preferably from 1 to 1000 μm, more preferably from 10 to 700 μm and particularly from 50 to 500 μm.

The preferred water-insoluble polymers are obtained by polymerization of monomers chosen from:
  vinyl esters and more particularly vinyl acetate;
  alkyl acrylates and methacrylates, the alkyl group of which comprises from 1 to 10 carbon atoms, for example methyl, ethyl, n-butyl or 2-ethylhexyl acrylates and methacrylates,
  vinylaromatic monomers, in particular styrene.

These monomers can be copolymerized with one another or with other monomers possessing ethylenic unsaturation to form homopolymers, copolymers or terpolymers.

Mention may be made, as nonlimiting examples of monomers which can be copolymerized with vinyl acetate and/or acrylic esters and/or styrene, of ethylene and olefins, such as isobutene; vinyl esters of saturated, branched or unbranched, monocarboxylic acids having from 1 to 12 carbon atoms, such as vinyl propionate, vinyl "Versatate" (registered trademark for the esters of branched $C_9$-$C_{11}$ acids), vinyl pivalate or vinyl laurate; esters of unsaturated mono- or dicarboxylic acids having 3 to 6 carbon atoms with alkanols having 1 to 10 carbon atoms, such as methyl, ethyl, butyl or ethylhexyl maleates or fumarates; vinylaromatic monomers, such as methylstyrenes or vinyltoluenes; vinyl halides, such as vinyl chloride or vinylidene chloride; diolefins, particularly butadiene; (meth)allyl esters of (meth)acrylic acid; (meth)allyl esters of the mono- and diesters of maleic, fumaric and itaconic acids; and alkene derivatives of amides of acrylic and methacrylic acids, such as N-methallylmaleimide.

It is possible in particular to choose at least 2 copolymerizable monomers of different natures in order to obtain a terpolymer.

Mention may be made, as example, of a terpolymer of acetate/versatate/dibutyl maleate type.

It is also possible to add, to the monomers which can be copolymerized with vinyl acetate and/or acrylic esters and/or styrene, at least one other monomer chosen from the following list: acrylamide, carboxylic or dicarboxylic acids possessing ethylenic unsaturation, preferably acrylic acid or methacrylic acid, sulfonic acids possessing ethylenic unsaturation and salts of the latter, preferably vinylsulfonic acid or 2-acrylamido-2-methylpropanesulfonic acid (AMPS), or sodium methallylsulfonate.

These monomers are added in an amount of between 0.05 and 10.0% by weight, with respect to the total weight of the monomers. These monomers are added during the polymerization; they provide the colloidal stability of the latex.

Generally, the polymerization of the monomers is carried out under emulsion conditions in the presence of an emulsifier and of a polymerization initiator.

The monomers employed can be introduced as a mixture or separately and simultaneously into the reaction medium, either before the beginning of the polymerization, all at once, or during the polymerization, in successive fractions or continuously.

The emulsifiers which can be used are anionic, cationic or nonionic emulsifiers.

They are generally employed in a proportion of 0.01 to 5% by weight, with respect to the total weight of the monomers.

Use is generally made, as emulsifying agent, of conventional anionic agents represented in particular by alkali metal alkyl sulfates, alkylsulfonates, alkylaryl sulfates, alkylarylsulfonates, aryl sulfates, arylsulfonates, sulfosuccinates or alkyl phosphates, or salts of hydrogenated or nonhydrogenated abietic acid.

The emulsion polymerization initiator is represented more particularly by hydroperoxides, such as aqueous hydrogen peroxide solution, cumene hydroperoxide, diisopropylbenzene hydroperoxide, para-menthane hydroperoxide or tert-butyl hydroperoxide, and by persulfates, such as sodium persulfate, potassium persulfate or ammonium persulfate. It is employed in an amount of between 0.05 and 2% by weight, with respect to the total weight of the monomers. These initiators are optionally used in combination with a reducing agent, such as sodium bisulfite or formaldehydesulfoxylate, polyethyleneamines, sugars (dextrose, sucrose) or metal salts. The amount of reducing agents used varies from 0 to 3% by weight, with respect to the total weight of the monomers.

The reaction temperature, which depends on the initiator used, is generally between 0 and 100° C. and preferably between 30 and 90° C.

Use may be made of a transfer agent in proportions ranging from 0 to 3% by weight, with respect to the monomer(s), generally chosen from mercaptans, such as n-dodecyl mercaptan or tert-dodecyl mercaptan, cyclohexene or halogenated hydrocarbons, such as chloroform, bromoform or carbon tetrachloride. It makes it possible to regulate the length of the molecular chains. It is added to the reaction medium either before the polymerization or during polymerization.

In a particularly preferred embodiment, the latex composition in the form of a redispersible powder comprises 0 to 35% by weight, preferably 3 to 15% by weight, of protective colloid, with respect to the total weight of the water-insoluble polymer.

The suitable protective colloids are poly(vinyl alcohol)(s) and derivatives of the latter, for example vinyl alcohol/vinyl acetate copolymers, polyvinylpyrrolidones, polysaccharides, for example starches (amylose and amylopectin), cellulose, guar gum, tragacanthic acid, dextrin, alginates and their carboxymethyl, methyl, hydroxyethyl or hydroxypropyl derivatives, proteins, for example casein, soybean proteins or gelatins, synthetic polymers, for example poly(meth)acrylic acid, poly(meth)acrylamide, poly(vinylsulfonic acid)(s) and water-soluble copolymers of these, melamine-formaldehydesulfonates, naphthalene-formaldehydesulfonates, styrene/maleic acid copolymers and vinyl ether/maleic acid copolymers. Poly(vinyl alcohol) is particularly preferred as protective colloid for the polymerization. A protective colloid particularly used is a poly(vinyl alcohol) having a degree of polymerization of 200 to 3500 and having a degree of hydrolysis of 80 to 98 mol %.

The preferred anticaking agents are aluminum silicates, calcium or magnesium carbonates, or mixtures of these, silicas, aluminum hydrate, bentonite, talc, or mixtures of dolomite and of talc, or of calcite and of talc, kaolin, barium sulfate, titanium oxide, or calcium sulfoaluminate (satin white).

The particle size of the anticaking agents is preferably within the range from 0.001 to 0.5 mm.

When the monovalent cation salts of carboxylic acids are added during polymerization or in postpolymerization, they are encountered in the aqueous phase of the emulsion polymerization.

The redispersible latex powder is preferably prepared by spray drying the aqueous polymer dispersion. This drying is carried out in conventional spray drying systems using atomization by means of single, double or multiple liquid nozzles or of a rotating disk. The discharge temperature chosen is generally within the range from 50 to 100° C., preferably from 60 to 90° C., depending on the system, the glass transition temperature of the latex and the degree of drying desired.

In order to enhance the storage stability and the flowability of the redispersible latex powder, it is preferable to introduce an anticaking agent into the spray column in conjunction with the aqueous polymer dispersion, which results in a preferable deposition of the anticaking agent over the particles of the dispersion.

Another subject matter of the present invention is an inorganic hydraulic binder composition, the inorganic hydraulic binders having improved water-repellent properties, which is capable of being obtained by the process described above.

Another subject matter of the present invention is the use of this hydraulic binder composition for enhancing the water repellency of building compositions.

The building compositions can in particular be coating compositions or inorganic building mixtures for producing inorganic components. The coating compositions are used in particular for inorganic substrates. The coating compositions can be aqueous or in the powder form. They are preferably in the powder form.

Examples of coating compositions are inorganic paints, lime paints, silicate paints, lime emulsion paints, silicate emulsion paints, priming coats, renders, for example mineral renders and silicate renders, high-filler coatings based on dispersions, fillers applied with a brush, reinforcing compositions, compounds coated with a trowel, and tiling adhesives, single surface dressings and also mortars, for example leaktight mortars, mortars for external thermal insulation systems or sealing mortars.

For the requirements of the present invention, inorganic building mixtures are any one of the raw mixtures which can be used to produce inorganic components which are themselves used in civil engineering structures, and form part of civil engineering structures, in particular if they are exposed to bad weather or require another type of water repellency.

Examples of components are concrete roof slabs and prefabricated bricks, fiber-reinforced concrete slabs, and also other finished products or insulating components.

The inorganic building materials can be composed of concrete, lime, cement, quartz sand, clay minerals, such as calcium silicate, porous concrete, bricks or else building mixtures based on fibers in which the fibers are natural fibers or synthetic fibers. Suitable natural fibers are inorganic fibers, such as rock wool, quartz fibers or ceramic fibers, or plant fibers, such as cellulose. Examples of cellulose fibers are jute fibers, coconut fibers and hemp fibers, or fibers derived from paper, board or recycled paper. Examples of suitable synthetic fibers are glass fibers, polymer fibers and carbon fibers.

Apart from the inorganic constituents, inorganic building compositions can also comprise organic additives, for example cellulose ethers or plasticizers. Other organic additives which can be used in inorganic building compositions are known to a person skilled in the art.

The amounts of inorganic hydraulic binder compositions with improved water-repelling properties generally used in building compositions are between 0.01 and 80% by weight.

The amounts of inorganic hydraulic binder compositions with improved water-repelling properties preferably used in mortar compositions are between 30 and 50% by weight.

The invention is described in detail below using examples but is not limited to the latter. The proportions and percentages shown in the examples are by weight, unless otherwise indicated.

EXAMPLES

Example 1

An acetate/versatate VeoVa10 (70/30) latex stabilized with poly(vinyl alcohol) is mixed with a monovalent cation salt of a carboxylic acid according to the various processes described below:

Process 1

The latex is used in the form of an emulsion with a solids content of 50% into which a monovalent cation salt of a carboxylic acid is introduced as a powder with stirring. Two additives are compared: sodium laurate (purity 99%) and sodium sterate (purity 98%). Samples comprising variable levels of additives are studied.

TABLE 1

| Nomenclature | Composition | |
| --- | --- | --- |
| "Process 1 - Control" | 100 | parts of latex emulsion |
| "Process 1 - 3% Sodium laurate" | 100 | parts of latex emulsion |
| | 1.5 | parts of sodium laurate powder |
| "Process 1 - 5% Sodium laurate" | 100 | parts of latex emulsion |
| | 2.5 | parts of sodium laurate powder |
| "Process 1 - 10% Sodium laurate" | 100 | parts of latex emulsion |
| | 5 | parts of sodium laurate powder |
| "Process 1 - 3% Sodium stearate" | 100 | parts of latex emulsion |
| | 1.5 | parts of sodium stearate powder |
| "Process 1 - 5% Sodium stearate" | 100 | parts of latex emulsion |
| | 2.5 | parts of sodium stearate powder |

TABLE 1-continued

| Nomenclature | Composition |
|---|---|
| "Process 1 - 10% Sodium stearate" | 100 parts of latex emulsion<br>5 parts of sodium stearate powder |

For all the samples comprising sodium laurate, the mixture obtained is a fluid milky liquid. On the other hand, those manufactured with sodium stearate exhibit a high yield point and do not flow when the sample is inverted. This example shows the advantage related to the use of highly soluble fatty acid salts, the size of the hydrocarbon chain of which acids is in the region of or less than $C_{12}$.

Process 2

An acetate/versatate VeoVa10 (70/30) latex stabilized with poly(vinyl alcohol) is mixed with a sodium laurate (purity 95%) solution with a concentration of 20%. The solution is brought to a temperature of 50° C. and then introduced with stirring into the latex in the following proportions (see table 2):

100 parts of latex emulsion
12.5 parts of sodium laurate solution

The mixture is subsequently diluted so that the solids content is 43.5% and then atomized using an atomizer of Niro Major type under the following conditions:

Inlet temperature: 125° C.
Outlet temperature: 67° C.
Flow rate: 27 l/hour

Atomization takes place in the presence of kaolin used as anticaking agent. The amount of kaolin introduced represents a fraction by weight of 14%.

TABLE 2

| Nomenclature | Composition |
|---|---|
| "Process 2 - Control" | 100 parts of latex emulsion which are atomized in the presence of 14.7 parts of kaolin |
| "Process 2 - 5% Sodium laurate" | 100 parts of latex emulsion and 12.5 parts of sodium laurate solution which are atomized in the presence of 14.7 parts of kaolin |

Process 3
The following mixture is prepared:
a powder formed of acetate/versatate VeoVa10 (70/30) latex stabilized with poly(vinyl alcohol) and atomized in the presence of 14% of kaolin (fraction by weight); particle size: D50=78 μm;
a sodium laurate (purity 95%) powder; particle size: D90=500 μm;

using a mixer of Turbulat type with regard to a total amount of material of 1 kg. The duration of the mixing operation is 30 min.

TABLE 3

| Nomenclature | Composition |
|---|---|
| "Process 3 - Control" | 100 parts of latex powder |
| "Process 3 - 5% Sodium laurate" | 100 parts of latex powder<br>5 parts of sodium laurate powder |

Example 2

A mortar formulation (siliceous fillers) having the following composition is prepared:

| Formulation 1 | |
|---|---|
| Sand BE 01 | 62.450 parts |
| Gray cement CEM I N CE CP2 NF | 35.000 parts |
| Ternal RG | 1 part |
| Boran lime | 0.5 part |
| Culminal C8350 | 0.05 part |
| Polymer | 1 part |

The term "polymer" is understood to mean an acetate/versatate VeoVa10 (70/30) latex stabilized with poly(vinyl alcohol). In the tests of example 2, the latex is used in the form of an emulsion with a solids content of 50% and prepared according to process 1 described in example 1. The proportions shown above refer to the dry weight of latex present in the emulsion. The water which accompanies it is taken into account in the mixing water. The degree of mixing is 18%.

In this example, two water-repelling additives according to the invention are compared: sodium laurate (n=12) and sodium stearate (n=18).

The mortars are mixed and then introduced into cylindrical molds (50 g of mortar). The combination is placed in a chamber, the relative humidity and $CO_2$ content of which are controlled by a supersaturated sodium bromide solution comprising 1M of sodium hydroxide. The samples are removed from the molds after conditioning for 1 day and then, after conditioning for 7 days, the curved face of the cylinders is coated with a paraffin mixture. The samples are subsequently brought into contact with deionized water via one of their flat faces. Water penetrates by capillary action into the cylinders, which are weighed after 30 minutes and 240 minutes. The weight of water which has penetrated is correlated with the surface area of the cylinders in contact with the water and divided by the square root of the contact time (unit=$g/m^2/\sqrt{h}$).

Separately, a drop of water with a volume of 15 μl is deposited on samples which have not been brought into contact with water and the time necessary for the drop to penetrate into the hardened mortar is recorded.

The results obtained are listed in table 4. They demonstrate the water-repelling nature of the additives and the better performances at an identical level of sodium laurate in comparison with sodium stearate. For sodium laurate, the data relating to the time for penetration of a drop of water confirm the results for water uptake by capillary action.

TABLE 4

| Polymer | Water uptake at 30 min ($g/m^2/\sqrt{h}$) | Water uptake at 240 min ($g/m^2/\sqrt{h}$) | Time for penetration of a drop of water (s) |
|---|---|---|---|
| "Process 1 - Control" | 469 | 435 | 162 |
| "Process 1 - 3% Sodium laurate" | 218 | 242 | 1920 |
| "Process 1 - 5% Sodium laurate" | 151 | 125 | 2400 |
| "Process 1 - 10% Sodium laurate" | 148 | 121 | >2400 |

TABLE 4-continued

| Polymer | Water uptake at 30 min (g/m²/√h) | Water uptake at 240 min (g/m²/√h) | Time for penetration of a drop of water (s) |
|---|---|---|---|
| "Process 1 - 3% Sodium stearate" | 273 | 330 | |
| "Process 1 - 5% Sodium stearate" | 352 | 435 | |
| "Process 1 - 10% Sodium stearate" | 235 | 292 | |

Example 3

A mortar formulation (fillers based on calcium carbonate) having the following composition is prepared:

| Formula 2 | |
|---|---|
| Durcal 65 | 61.450 parts |
| Gray cement CEM I N CE CP2 NF | 35.000 parts |
| Ternal RG | 1 part |
| Boran lime | 0.5 part |
| Culminal C8350 | 0.05 part |
| Polymer | 2 parts |

The term "polymer" is understood to mean an acetate/versatate VeoVa10 (70/30) latex stabilized with poly(vinyl alcohol). In the tests of example 3, the latex is used in the form of an emulsion with a solids content of 50% and prepared according to process 1 described in example 1. The proportions shown above refer to the dry weight of latex present in the emulsion. The water which accompanies it is taken into account in the mixing water. The degree of mixing is 28%.

The tests carried out are identical to those described in example 2.

TABLE 5

| Polymer | Water uptake at 240 min (g/m²/√h) | Time for penetration of a drop of water (s) |
|---|---|---|
| "Process 1 - Control" | 804 | 221 |
| "Process 1 - 5% Sodium laurate" | 221 | 1204 |

The results obtained are presented in table 5. They show that the water-repelling nature of the polymer "Process 1-5% Sodium laurate" is also apparent in a formulation comprising fillers of calcium carbonate type.

Example 4

Mortar formulations according to the compositions described in Examples 2 and 3 (formulation 1 and formulation 2) are prepared. The polymer introduced into these formulations corresponds to the preparations described in example 1 (process 2 and process 3).

The mortars are mixed, then poured into standardized molds with dimensions of 4×4×16 cm and passed over a shock table. They are removed from the molds the day after and then placed in a chamber conditioned at 23° C. and 55% relative humidity. One week after manufacturing the mortars, they are coated with paraffin over 4 of their faces, forming a ring and including the 2 square faces. The samples are subsequently steeped via one of their free faces in deionized water. The amount of water taken up by capillary action is measured by weighing after 30 min and 240 min.

The results obtained are presented in tables 6 and 7.

It is found, in this example, that processes 2 and 3 for the preparation of latexes having a water-repelling nature according to the invention make it possible to significantly limit the uptake of water by capillary action. The effect is observed in two formulations comprising inorganic fillers of different chemical natures (siliceous sand and calcium carbonate).

TABLE 6

| | Formulation 1 | |
|---|---|---|
| Polymer | Water uptake at 30 min (g) | Water uptake at 240 min (g) |
| "Process 2 - Control" | 4.9 | 10.3 |
| "Process 2 - 5% Sodium laurate" | 4.6 | 8.0 |
| "Process 3 - 5% Sodium laurate" | 3.2 | 6.5 |

TABLE 7

| | Formulation 2 | |
|---|---|---|
| Polymer | Water uptake at 30 min (g) | Water uptake at 240 min (g) |
| "Process 2 - Control" | 15.3 | 33.6 |
| "Process 2 - 5% Sodium laurate" | 9.3 | 17.3 |
| "Process 3 - 5% Sodium laurate" | 8.4 | 20.5 |

What is claimed is:

1. A method for enhancing the water repellency of an inorganic hydraulic binder composition, comprising the step of adding a sufficient amount of at least one monovalent cation salt of a carboxylic acid to said composition, said acid having an hydrocarbon chain optionally having halogens, hydroxyl groups, ether groups, thioether groups, ester groups, amide groups, carboxyl groups, sulfonic acid groups, carboxylic anhydride groups or carbonyl groups
   wherein the monovalent cation salt of a carboxylic acid has the formula $C_nH_{(2n-1)}OO^-X^+$ wherein n=4 to 18 and X is an alkali metal.

2. The method as claimed in claim 1, wherein the monovalent cation salt of a carboxylic acid is in the form of a powder in the inorganic hydraulic binder composition.

3. The method as claimed in claim 1, wherein the amount is between 0.001% and 3% by dry weight of the monovalent cation salt of a carboxylic acid, with respect to the total weight of the composition.

4. The method as claimed in claim 3, wherein the amount is between 0.01% and 0.5%.

5. The method as claimed in claim 4, wherein the amount is between 0.03% and 0.15%.

6. The method as claimed in claim 1, further comprising the step of premixing the monovalent cation salt of a carboxylic acid with a latex composition.

7. The method as claimed in claim 6, wherein the amount of the monovalent cation salt of a carboxylic acid, with respect to the total weight of dry latex, is between 0.1 and 20% by weight, with respect to the weight of the dry latex.

8. The method as claimed in claim 6, wherein the monovalent cation salt of a carboxylic acid is added in the powder form to the latex composition in the form of a redispersible powder.

9. The method as claimed in claim 6, wherein the monovalent cation salt of a carboxylic acid is added in the powder or solution form to the latex composition in the form of an aqueous dispersion during the polymerization or at the end of the polymerization.

10. The method as claimed in claim 6, wherein the monovalent cation salt of a carboxylic acid is added in the powder form to the latex composition during a further step of drying by atomization of the latex.

11. The method as claimed in claim 6, wherein the latex composition comprises:
at least one water-insoluble polymer,
from 0 to 35% by weight, with respect to the total weight of the polymer, of at least one protective colloid,
from 0 to 30% by weight, with respect to the total weight of the polymer, of anticaking agents, and
from 0.1 to 20% by weight, with respect to the total weight of the polymer, of at least one monovalent cation salt of a carboxylic acid.

12. The method as claimed in claim 11, wherein the water-insoluble polymer is obtained by polymerization of vinyl esters, alkyl acrylates, alkyl methacrylates, whose alkyl group has from 1 to 10 carbon atoms, and/or vinylaromatic monomers.

13. The method as claimed in claim 12, wherein the water-insoluble polymer is obtained by polymerization of monomers selected from the group consisting of: vinyl acetate, methyl methacrylate, ethyl methacrylate, n-butyl methacrylate, 2-ethylhexyl methacrylate, methyl acrylate, ethyl acrylate, n-butyl acrylate, 2-ethylhexyl acrylate, and styrene.

14. The method as claimed in claim 12, wherein the monomers are further copolymerized with other monomers possessing ethylenic unsaturation being olefins, vinyl esters of saturated, branched or unbranched, monocarboxylic acids having from 1 to 12 carbon atoms, esters of branched $C_9$-$C_{11}$ acids, vinyl pivalate or vinyl laurate; esters of unsaturated mono- or dicarboxylic acids having 3 to 6 carbon atoms with alkanols having 1 to 10 carbon atoms, vinylaromatic monomers, vinyl halides, diolefins, (meth)allyl esters of (meth)acrylic acid; (meth)allyl esters of the mono- and diesters of maleic, fumaric and itaconic acids; or alkene derivatives of amides of acrylic and methacrylic acids.

15. The method as claimed in claim 11, wherein the anticaking agents are aluminum silicates, calcium carbonates, magnesium carbonates, silicas, aluminum hydrate, bentonite, talc, kaolin, barium sulfate, titanium oxide, or calcium sulfoaluminate (satin white).

16. The method as claimed in claim 1, wherein the monovalent cation salt of a carboxylic acid has the formula $C_nH_{(2n-1)}OO^-X^+$ wherein n=4 to 18 and X is sodium, potassium, lithium, ammonium or quaternary amines.

17. The method as claimed in claim 16, wherein n=8 to 16.

18. The method as claimed in claim 1, wherein the monovalent cation salt of a carboxylic acid is sodium laurate and/or potassium laurate.

19. The method as claimed in claim 1, wherein the hydraulic binder is a cement, cement of Portland, high-alumina cement, blast-furnace cement, fly ash, calcined shale or pozzolan.

20. A grout, mortar or concrete comprising an inorganic hydraulic binder composition made by the process of claim 1.

21. A method for enhancing the water repellency of an inorganic hydraulic binder composition, comprising the step of adding a sufficient amount of at least one monovalent cation salt of a carboxylic acid to said composition, said acid having an hydrocarbon chain optionally having halogens, hydroxyl groups, ether groups, thioether groups, ester groups, amide groups, carboxyl groups, sulfonic acid groups, carboxylic anhydride groups or carbonyl groups and the step of premixing the monovalent cation salt of a carboxylic acid with a latex composition
wherein the latex composition comprises:
at least one water-insoluble polymer,
from 0 to 35% by weight, with respect to the total weight of the polymer, of at least one protective colloid,
from 0 to 30% by weight, with respect to the total weight of the polymer, of anticaking agents wherein the anticaking agents are aluminum silicates, calcium carbonates, magnesium carbonates, silicas, aluminum hydrate, bentonite, talc, kaolin, barium sulfate, titanium oxide or calcium sulfoaluminate (satin white), and
from 0.1 to 20% by weight, with respect to the total weight of the polymer, of at least one monovalent cation salt of a carboxylic acid.

\* \* \* \* \*